G. A. WELZENBACH.
MIXING MACHINE.
APPLICATION FILED APR. 18, 1917.
1,240,274.
Patented Sept. 18, 1917.
2 SHEETS—SHEET 1.
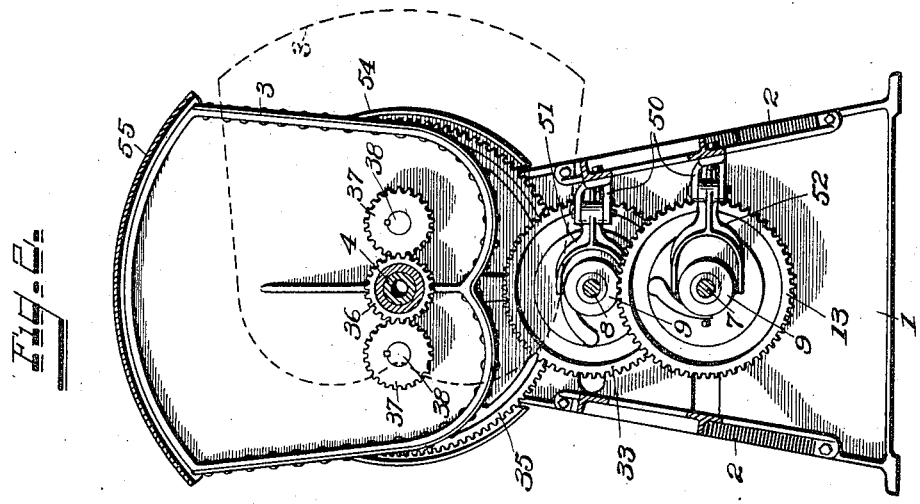
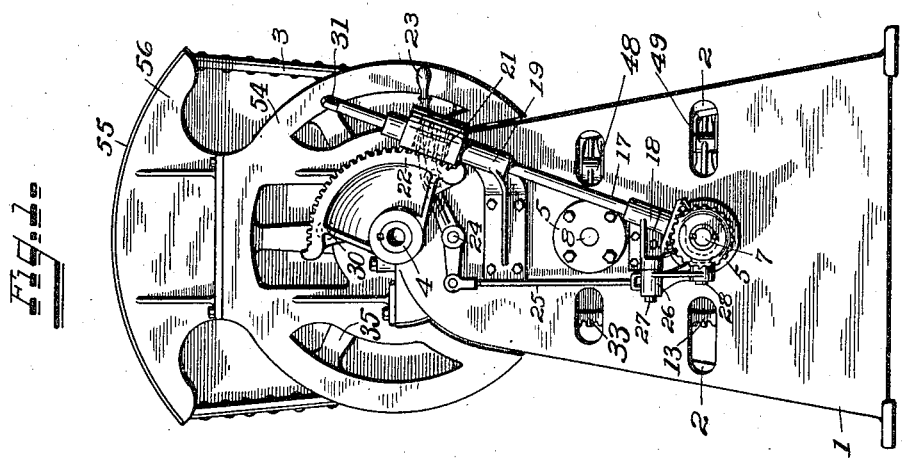
Inventor
George A. Welzenbach.
Atty.

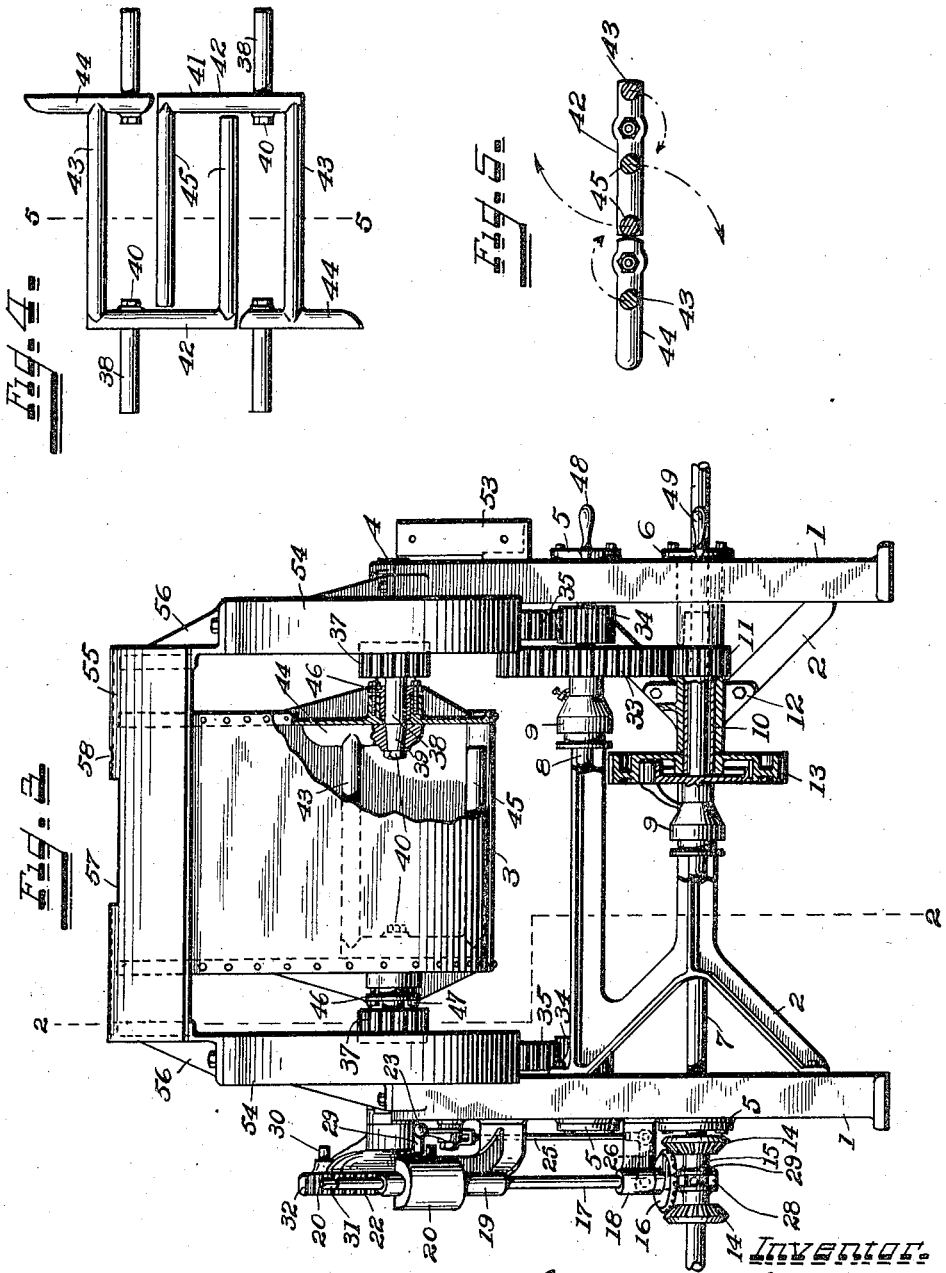

Stateside Patent Office.

UNITED STATES PATENT OFFICE.

GEORGE A. WELZENBACH, OF PEORIA, ILLINOIS.

MIXING-MACHINE.

1,240,274.   Specification of Letters Patent.   Patented Sept. 18, 1917.

Application filed April 18, 1917. Serial No. 162,825.

*To all whom it may concern:*

Be it known that I, GEORGE A. WELZENBACH, a citizen of the United States, residing at Peoria, in the county of Peoria and State of Illinois, have invented certain new and useful Improvements in Mixing-Machines, of which the following is a full, clear, and exact description, reference being had to the accompanying drawings, forming part of this specification.

My invention relates primarily to machines which are used for mixing dough, though it is capable of advantageous use for the mixing of other substance.

One object of my invention is the provision of means whereby the substance being mixed will be subjected to stretching operations to cause an elongation of the fibers of the material in addition to directly mixing the ingredients.

Another object of my invention is the provision of means whereby the agitator may be removed from the hopper of the machine should occasion require.

Another object of my invention is the provision of suitable driving elements and connections whereby the various parts of the machine may be operated at will.

Another object of my invention is the provision of suitable mechanism for tilting the hopper of the machine, the above mentioned mechanism comprising means for operating it either by hand or from the power of the machine.

Other objects of my invention will appear and be described throughout the specification.

The novelty of my invention will be hereinafter more fully set forth and specifically pointed out in the claims.

In the accompanying drawings:

Figure 1, Sheet 1, is an end view of a machine embodying my invention.

Fig. 2, Sheet 1, is a sectional end view of the machine, the section being taken approximately on the line 2—2 of Fig. 3.

Fig. 3, Sheet 2, is a front elevation of Fig. 1, a part of the hopper of the machine being broken away.

Fig. 4, Sheet 2, is a plan view of the agitators removed from the hopper and shown in intersecting position.

Fig. 5, Sheet 2, is a sectional view of Fig. 4 taken on the dotted line 5—5, the figure being turned to a position corresponding to Figs. 1 and 2.

The same numerals of reference are used to indicate identical parts in all the figures.

For purposes of illustration and to show one form of machine in which my invention may be embodied, 1 represents a supporting member of which, as shown in Fig. 2, two pieces are employed to form the main frame of the machine, the two pieces being connected together by front and rear braces 2. A hopper 3 is provided with trunnions 4 by means of which it is mounted in the upper portion of the frames 1.

As shown in Figs. 1 and 3, the frames 1 are each provided with bearing flanges 5, there being three of such flanges employed together with a fourth flange 6 shown in Fig. 3 which will be presently described more in detail. A pair of horizontal shafts 7 and 8 are mounted in the flanges 5 and 6, each of the shafts carrying a clutch 9, the two clutches being in all respects duplicates though connected in different position upon the shafts 7 and 8 as shown in Fig. 3.

A quill 10 which is provided with a pinion 11, is mounted in a bearing 12 which extends between and is fastened to each of the members 2, the quill 10 extending into and having a bearing within the extension of the flange 6 so that the pinion 11 is mounted between two bearings, the quill 10 also carrying a driving gear 13 which may be either a toothed wheel or in some instances a pulley upon which a belt may run, the gear 13 being the main driver for the machine and being adapted to be driven from any suitable source of power such as an electric motor. The clutch 9 of the shaft 7 is adapted to engage the gear 13 and when so engaged, the motion of the gear 13 is imparted to the shaft 7 which, as clearly shown in Fig. 3 may be extended beyond the ends of the machine to afford a means for driving a cake mixing machine from one end of the shaft 7 and a sifter or elevator or both from the other end of the shaft 7.

A pair of bevel gears 14 are mounted on a sleeve 15 which is feathered on the shaft 7, the two bevel gears 14 and sleeve 15 being adapted to be moved along in shaft 7 to bring either one of the gears 14 into mesh with a similar gear 16 which is fixed upon the lower end of a shaft 17, the latter being mounted in bearings 18 and 19 which are secured to the outside of one of the side frames 1. The bearing 19 is extended to form a worm housing 20 and a worm 21, dotted lines, Fig. 1, is mounted on the shaft 17 within the housing 20, the worm 21 meshing with and driving a sector 22 which is keyed upon the extended end of one of the trunnions 4 of the hopper 3, the construction and arrangement of the parts just described being such that when the shaft 17 is revolved in one direction, the hopper 3 will be tilted from the position shown in Fig. 1 to the dotted position shown in Fig. 2, and when the shaft 17 is rotated in the opposite direction, the hopper will be returned to the position shown in Fig. 1.

To properly manipulate the sleeve 15 and bevel gears 14, an operating handle 23 is mounted upon the side frame 1 as by means of a stud 24, and a rod 25 extends from the handle 23 to a bell crank 26 which is mounted upon a stud 27 carried by the bearing 18, the downwardly extending arm of the bell crank 26 carrying a fork 28 which embraces a groove 29 in the sleeve 15, the construction and mounting of the parts just described being such that as the handle 23 is raised or lowered, the sleeve 15 will be shifted along the shaft 7 to bring one or the other of the gears 14 into mesh with the gear 16 to cause the rotation of the shaft 17 in one or the other direction.

To provide means for causing the disengagement of either of the gears 14 from the gears 16 when the hopper has been turned to the required position, the handle 23 is provided with an extension 29, Fig. 3, which lies in the path of travel of a pair of pins 30 which are carried by the sector 22 so that as the parts are operated, one or the other of the pins 30 comes in contact with the extension 29 of the handle 23 thereby disengaging the driving mechanism from the shaft 17 and bringing the latter to rest.

To afford means of tilting the hopper 3 when the shaft 7 may be at rest, the shaft 17 is extended above the bearing 19 and is squared at its upper end as at 31 to afford means for attachment of a hand crank whereby the shaft 17 may be rotated in either direction, the sector 22 being provided with stops 32 to limit its movement by hand in either direction.

It is to be observed that the rotation of the shaft 17 and the angle of the threads on the worm 21 must be such that when the hopper is in a vertical position as shown in Fig. 1, and it is desired to lower it to the dotted position shown in Fig. 2, the handle 23 must be raised so that when the pin 30 strikes the extension 29 the power elevating and dumping mechanism will be disengaged, and also that when it is desired to raise the hopper to the vertical position, the handle 23 must be depressed.

A gear 33 is mounted free to turn on the shaft 8 and in mesh with and driven by the pinion 11 before described, so that when the driving mechanism 13 is set in motion. the gear 33 is also rotated and, by means of the clutch 9 on the shaft 8, the rotation of the gear 33 may be imparted to the shaft 8 which carries a pair of pinions 34, the latter meshing with and driving a pair of gears 35 which are mounted free to turn on the trunnions 4 and which carry driving pinions 36, Fig. 2. Each of the driving pinions 36 meshes with and drives a similar pinion 37 which is attached to and drives a stub shaft 38.

The stub shafts 38 extend through the end walls of the hopper 3 and are preferably tapered as at 39, Fig. 3, and provided with nuts 40, the tapered portions and the nuts serving as means for connecting the stub shafts 38 to the agitators 41.

As shown in Fig. 4, each agitator comprises an end bar 42, a cross bar 43, an end bar 44, and a second cross bar 45 which is attached to the end bar 42 at one end, the other end being free and it will be noted by reference to Fig. 4 that if two of these agitators are mounted as shown and simultaneously operated, the bars 45 will intersect each other's path of travel while the bars 43 will not intersect each other's path of travel. The result of this intersecting and non-intersecting movement is that the substance contained within the hopper 3, in addition to being stirred and agitated by the movement of the agitators, will be subjected to a series of stretching operations when the consistency of the material being mixed has reached a point where its condition is sufficiently adhesive.

It will be further observed that the bars 44 are extended beyond the cross bars 43 to form scrapers extending to the same radius as the bars 42 and having the function of removing any of the material being mixed which might adhere to the end walls of the hopper.

Each of the stub shafts 38 passes through a bearing 46, Fig. 3, which is in the form of a stuffing box and is adapted to be longitudinally moved by means of the studs 47, the object of this construction being to afford means of lubrication for the stub shafts 38 while at the same time preventing the leakage of any of the liquid matter from the inside of the hopper A lever 48 is provided for operating the clutch 9 of the shaft 8, and a similar lever 49 operates the clutch 9 of the shaft 7, each of these levers being mounted in a bracket 50, Fig. 2, which is secured to the brace 2, each of these levers 48 and 49 being also provided with a shifter fork 51 and 52 respectively to engage the sliding cones of the clutches.

Where it is desired to operate the machine by means of an electric motor, a bracket 53 may be attached to the side of one of the members 1 to afford a convenient method of mounting a starting panel for the motor.

As means of protecting the gears 35, gear housing 54 may be mounted on the members 1 and may sufficiently inclose the gearing of the machine to protect the latter and also to protect the operator.

It will be observed by reference to Fig. 2 that the upper portion of the end walls of the hopper 3 are formed on a radius struck from the center of the trunnions 4 and when in a vertical position, the hopper moves under a cover 55 which is supported on brackets 56, the latter being mounted on the gear guards 54. An aperture 57, Fig. 3, may be formed in the cover 55 and afford means for introducing the material to be mixed to the hopper 3, and if desired, a second opening 58 may be provided through which the liquid ingredients may be introduced, the intention being that the opening 57 will be provided with a spout leading from a source of supply and the opening 58 provided with a pipe so that when the hopper 3 is in the vertical position no foreign substance can find its way thereto, while the mixture is being agitated.

It is to be observed that the agitators 41 may be removed from the hopper 3 without the necessity of taking either of the end walls therefrom or dismounting the hopper from the frame of the machine, the removal being effected by unscrewing the nuts 40 whereupon the stub shafts 38 may be pressed or driven outwardly to release the agitator so that it may be removed from the hopper.

Having thus fully described my invention, I claim:—

1. In a mixing machine, the combination of a frame, a shaft journaled therein, a driving gear mounted free to turn concentric with said shaft, a clutch carried by said shaft and adapted to receive motion from said driving gear, a second shaft journaled on said frame and carrying a driving gear loosely mounted concentric therewith and adapted to receive motion from said first mentioned driving gear, a clutch carried by said shaft and adapted to receive motion from said driving gear, a mixing hopper carried by said frame, an agitator within said hopper, connections between said second shaft and said agitator whereby when said second mentioned clutch is engaged said agitator will be operated, a tilting gear in connection with said mixing hopper whereby the latter may be tilted, and means whereby when said first mentioned clutch is engaged said tilting gear may be operated.

2. In a mixing machine, the combination of a frame, a tilting hopper mounted thereon, a cover for said hopper and mounted on said frame whereby when said hopper is in mixing position the opening therein will be closed, a shaft mounted on said frame, a driving mechanism mounted free to turn concentric with said shaft, a clutch whereby said shaft may receive motion from said driving mechanism, a second shaft mounted on said frame, driving mechanism mounted free to turn concentric therewith and receiving motion from said first mentioned driving mechanism, a clutch between said driving mechanism and said shaft whereby the latter may be operated, an agitator in said hopper, gearing between said agitator and said second shaft whereby when the latter is operated said agitator will be operated, and a tilting gear coacting between said hopper and said first mentioned shaft whereby when the latter is operated said hopper may be tilted.

3. In a mixing machine, the combination of a tilting mixing hopper, an agitator therein, a frame upon which said hopper is mounted, a pair of shafts carried by said frame and each provided with a clutch, connection between one of said shafts and a tilting gear whereby when said shaft is operated said hopper may be tilted, connection between the other of said shafts and said agitator whereby when said shaft is operated said agitator will be operated, and driving mechanism adapted to be engaged by the clutch of either of said shafts.

4. In driving mechanism for mixing machines, the combination of a quill driving gear, a shaft passing therethrough, a clutch on said shaft for engaging said gear, hopper tilting mechanism coöperating with said shaft, an agitator driving shaft, a clutch carried thereby, a driving member therefor and operated by said quill driving gear, and means for operating said clutches independently.

GEORGE A. WELZENBACH.